United States Patent [19]

MacAdams et al.

[11] 4,032,600
[45] June 28, 1977

[54] RESIN FORMULATION FOR ROTATIONAL MOLDING AND SHAPED STRUCTURES

[75] Inventors: John L. MacAdams, Schaumburg, Ill.; William C. L. Wu, Pittsford, N.Y.; Richard S. Joyner, DesPlaines, Ill.

[73] Assignee: Chemplex Company, Rolling Meadows, Ill.

[22] Filed: Mar. 24, 1976

[21] Appl. No.: 670,082

Related U.S. Application Data

[60] Continuation-in-part of Ser. No. 506,271, Sept. 16, 1974, abandoned, which is a division of Ser. No. 327,577, Jan. 29, 1973, abandoned.

[52] U.S. Cl. .................... 260/897 B; 260/897 A; 264/310
[51] Int. Cl.² .................................... C08L 23/08
[58] Field of Search ................. 260/897 A, 897 B

[56] References Cited

UNITED STATES PATENTS 3,784,668  1/1974  Neidinger .................... 264/310

FOREIGN PATENTS OR APPLICATIONS 798,416  11/1968  Canada ........................ 260/897
1,043,078  9/1966  United Kingdom ............ 260/897

*Primary Examiner*—Carman J. Seccuro
*Attorney, Agent, or Firm*—Wegner, Stellman, McCord, Wiles & Wood

[57] ABSTRACT

A three component blend of polymers comprising a polyethylene homopolymer or ethylene-alkene copolymer with an ethylene-vinyl acetate copolymer and either an ethylene-propylene copolymer or an ethylene-propylene-diene terpolymer. These three component blends are particularly suitable for rotational molding of shaped structures as they have synergistic properties of environmental stress crack resistance and high impact strength of the finished products. The disclosure also includes shaped structures comprising these blends.

10 Claims, No Drawings

RESIN FORMULATION FOR ROTATIONAL MOLDING AND SHAPED STRUCTURES

CROSS-REFERENCE TO RELATED APPLICATIONS

This application is a continuation-in-part of our copending application Ser. No. 506,271, filed Sept. 16, 1974, now abandoned which was a division of application Ser. No. 327,577, filed Jan. 29, 1973, and now abandoned.

BACKGROUND OF THE INVENTION

This invention relates to three component blends of high density polyethylene with specified copolymers and combinations of copolymers that are particularly useful for rotational molding and relates also to the structures produced therefrom.

U.S. Pat. No. 3,261,889 discloses a blend of a low density polyethylene and an ethylene-propylene-diene terpolymer to improve environmental stress crack resistance (ESCR). (A table of abbreviations is presented at the end of this specification.) The three component blends of this invention have the ESCR improvement significantly above that achieved via a two component blend due to the unexpected synergism of the blend components. In the conventional rotational molding resins and blends it is customary to use polyethylene of narrow molecular weight distribution and with low melt flow to achieve high impact strength. These prior resins are difficult to process apparently due to their high apparent melt viscosity. They are generally not warp resistant. It has been known to blend EVA (ethylene-vinyl acetate copolymer) with polyethylene in order to improve the impact strength of the resin. However, polyethylene-EVA copolymer blends are not nearly as effective as the blends of this invention in improved impact resistance of rotomolded structures. In addition, these prior and conventional rotational molding blends containing polyethylene do not have the above advantages of the blends of this invention.

SUMMARY OF THE INVENTION

The blends of this invention can be generally summarized as comprising (1) either a high density polyethylene or an ethylene-alkene copolymer containing 4 or 6 carbon atoms in the alkene group blended with (2) either an ethylene-propylene essentially random copolymer or an essentially random terpolymer of ethylene and propylene and a monomer that is either 1,4-hexadiene, 5-ethylidine-2-norbornene and 5-methylene-2-norbornene, and (3) ethylene-vinyl acetate copolymer.

Preferred ranges of amounts are 60–80 wt.% of the polyethylene or ethylene-alkene copolymer with 5–20 wt.% of ethylene-propylene copolymer or terpolymer and 5–30 wt.% of EVA for a total of 100%. In the ethylene-propylene copolymers the preferred proportions are 40–95 wt.% of ethylene and 5–60 wt.% of propylene for a total of 100%. In the terpolymer there is preferably 40–95 wt.% of ethylene, 5–60 wt.% of propylene and 1–8 wt.% of the third monomer listed above so that the total is 100%.

The ethylene-vinyl acetate copolymers preferably contain 65–95 wt.% of ethylene and 5–35 wt.% of vinyl acetate for a total of 100%.

DESCRIPTION OF THE PREFERRED EMBODIMENTS

The blends of this invention have characteristics that make them highly useful for rotational molding to produce molded shaped structures. Thus the blends of this invention have good processability, high impact strength, produce smooth surfaces in the rotationally molded structures with a virtual absence of warpage in the structures, have easy flow during the rotational molding and the structures produced have a high resistance to environmental stress cracking.

To obtain maximum improvement in the impact strength and ESCR of the blend, the preferred elastomer component, i.e. ethylene-propylene copolymer and ethylene-propylene-diene terpolymer, should have a narrow molecular weight distribution as measured on the Gel Permeation Chromatograph. Tests have shown that the blend properties improve with narrowing molecular weight distribution of the elastomer component of this invention and with increasing elastomer content up to the concentration disclosed herein.

The blends of this invention may be prepared with any desired mixer or blender so long as the resulting blends are homogeneous and therefore uniform. Thus the mixers may be either roll mills, banburies, kneaders or extruders or the like and the mixing temperatures are preferably above the softening point of the ingredients and, for example, may be within the range of 175–500° F. The blends of this invention are processed in the normal manner in the thermoplastic range of the particular blend to produce shaped structures that are themselves homogeneous and that have desired improved characteristics including those specifically noted above.

Certain values which are important for the proper processing of the blends of this invention are standard procedures that are customarily used in this art. Thus the test for environmental stress cracking of ethylene containing plastics is the test designated D1693-70 of A.S.T.M. The test for impact resistance of plastics is designated as ASTM Method A of D256-56. The standard method used for testing tensile-impact energy to break plastics is designated as ASTM D 1822-68 with the actual test specimen being that shown in FIG. 4B of the paper entitled "Test for Tensile-Impact Energy to Break Plastics" at page 590. Mooney viscosity data is obtained according to ASTM-D1646, Viscosity And Curing Characteristics of Rubber By The Shearing Disc Viscometer.

The high density polyethylene used in this invention includes ethylene homopolymers as well as ethylene butene-1 and ethylene hexene-1 copolymers preferably with an annealed density range of 0.940 to 0.970. These high density polyethylene resins can be produced by Ziegler or modified Ziegler catalysts, chromium oxide catalysts, molybdenum oxide catalysts or any of the available processes for producing essentially linear crystalline polyethylene. The EVA copolymers used in this invention can be produced by free radical catalysts at high pressures. The vinyl acetate content in these copolymers can range from 5% to 35%. The ethylene-propylene copolymers and ethylene-propylene-diene terpolymers used in this invention are essentially random copolymers that can be produced via the transition metal catalyst. The preferred compound should have an ethylene content above 40% with high molecular weight and narrow molecular weight distribution.

Where an ethylene-alkene (alkene = 4 or 6 carbons) copolymer is used in the blend the alkene content may be up to 10 wt.% of the ethylene-alkene copolymer with the ethylene being from 90–100 wt.%.

The three component blends of this invention produce a synergistic effect with relation to the impact strength and ESCR properties of the resin in that the overall effect is greater than that which would be expected by the additive properties of the individual components.

The preferred ethylene-vinyl acetate copolymer should contain at least 5% vinyl acetate with an MI of 1 or above. The blend properties are shown to improve with increasing vinyl acetate concentration up to the including the preferred range disclosed herein. The processability of the blend on rotational molding machines improves when the polyethylene and the EVA copolymer components have a good match of melt viscosities.

SPECIFIC EXAMPLES

EXAMPLE 1

A two component blend of 15% ethylene-propylene-diene terpolymer having a Mooney viscosity of about 50 (ML1+4/250° F.) and 85% of ethylene-hexene-1 copolymer of 0.955 density and 18 MI was produced on a Banbury mixer. The mixing time was 3 ½ minutes, achieving a drop temperature of approximately 320° F. The mixture was dropped into an extruder and pelletized. The resulting blend has a nominal MI of 6.5 and 0.942 density. A comparison of parts rotomolded from this blend and other commercial rotomolding resins under the same molding conditions show that the blend of this example is characterized by excellent impact strength and dimensional stability (very low warpage) plus smooth glass-like interior surfaces and an unusually wide range of molding temperature and cycle times.

A comparison between the physical properties of rotomolded parts from the blend in Example 1 and a direct synthesis copolymer rotomolding resin is shown in Chart I.

CHART I

| Physical Properties of Rotomolded Parts | | |
|---|---|---|
| | Blend in Ex. 1 | HDPE Copolymer Rotomolding Resin |
| MI (g/10 min) | 7.1 | 4.5 |
| Density (g/cc) | 0.936 | 0.935 |
| Tensile Impact (ft-lbs/in$^2$) | 64 | 21 |
| Notched Izod (ft-lbs/in width) | 4.6 (P) | 0.81 (C) |
| Bell ESCR F$_{50}$ (hrs) | 4.3 | break on bending |

The above results indicate that the blend of this invention has significantly better properties on rotomolded structures than that of HDPE copolymer resins with similar MI and density properties but produced by direct synthesis.

EXAMPLE 2

A three component blend of 10% ethylene-propylene-diene terpolymer with 20% 0.950 density, 2.5 MI, 27.6% vinyl acetate content EVA copolymer plus 70% of a 0.964 density, 12 MI homopolymer polyethylene was produced on a Banbury mixer and pelletized as in Example 1. Rotomolded parts from this nominal 5.5 MI, 0.953 density blend were characterized by excellent impact resistance and superior ESCR (about 60 hours). The impact strength and especially the ESCR are the result of a synergistic effect between the EPDM and the EVA copolymer. Chart II show this effect for compression molded samples.

EXAMPLE 3

A blend of 30% EPDM and 70% homopolymer is prepared using the same materials and procedures as in Example 2. Physical properties of compression molded plaques are shown in Chart II.

EXAMPLE 4

A blend of 30% EVA copolymer and 70% homopolymer polyethylene is prepared using the same materials and procedures as in Example 2. Physical properties of compression molded plaques are shown in Chart II hereinafter.

EXAMPLES 5–12

The effect of EPDM and EVA concentration on the physical properties of compression molded plaques from the resulting blends is shown in Chart III hereinafter. The materials and mixing conditions are the same as in Example 2 except that the hexene copolymer used in Example 1 was used in place of the homopolymer used in Example 2. This data also shows in Example 12 the synergistic effect of the PE-EVA-EPDM combination.

CHART II

| | Concentration Wt. % | | | Synergistic Effects | | | | |
|---|---|---|---|---|---|---|---|---|
| Example | PE | EPDM | EVA | MI (g/10 min) | Density (g/cc) | Notched Izod (ft-lbs/in. width) | Tensile Impact (ft-lbs/in$^2$) | Bell ESCR F$_{50}$ (hrs) |
| Control | 100 | — | — | 12 | 0.96+ | 0.8 (C) | 35 | — |
| 2 | 70 | 10 | 20 | 5.8 | 0.956 | N.B. | 130 | 264 |
| 3 | 70 | 30 | — | 2.5 | 0.940 | N.B. | 136 | 58 |
| 4 | 70 | — | 30 | 9.5 | 0.960 | 2.0 (C) | 77 | 2.0 |

CHART III

| | Concentration Wt. % | | | Effect of EPDM and EVA Concentration Synergistic Effects | | | | |
|---|---|---|---|---|---|---|---|---|
| Example | PE | EPDM | EVA | MI (g/10 min) | Density (g/cc) | Notched Izod (ft-lbs/in. width) | Tensile Impact (ft-lbs/in$^2$) | Bell ESCR F$_{50}$ (hrs) |
| 5 | 100 | — | — | 18 | 0.955 | 0.8 (C) | 35 | — |

CHART III-continued

| | Concentration Wt. % | | | Effect of EPDM and EVA Concentration Synergistic Effects | | | | |
|---|---|---|---|---|---|---|---|---|
| Example | PE | EPDM | EVA | MI (g/10 min) | Density (g/cc) | Notched Izod (ft-lbs/in. width) | Tensile Impact (ft-lbs/in²) | Bell ESCR $F_{50}$ (hrs) |
| 6 | 90 | 10 | — | 9.6 | 0.948 | 1.2 (C) | 47 | — |
| 7 | 85 | 15 | — | 5.6–6.7 | 0.941–43 | 4.4-N.B. | 61–80 | 4.3–16 |
| 8 | 85 | — | 15 | 15 | 0.954 | 1.2 (C) | 71 | 4.4 |
| 9 | 80 | 20 | — | 4.8–5.9 | 0.938–41 | N.B. | 76–80 | 24 |
| 10 | 70 | 30 | — | 2.8 | 0.930 | N.B. | 105 | 94 |
| 11 | 70 | — | 30 | 11 | 0.952 | 3.0 (P) | 81 | 82 |
| 12 | 70 | 10 | 20 | 5.4 | 0.943 | N.B. | 93 | > 3000 |

The following Examples 13–32 of Chart IV illustrate the synergistic results in environmental stress crack resistance achieved with the three component blends of this invention where the relatively expensive Component (2) is used in the relatively small proportions of 5–20 weight percent.

CHART IV

| | Component (1) | | | Component (2) | | Component (3) | | Bell ESCR $F_{50}$ (hrs) | |
|---|---|---|---|---|---|---|---|---|---|
| Example | MI (g/10 min) | Density (g/cc) | Polyethylene Wt. % | Type | Wt. % | VAC Wt. % | EVA Wt. % | Obtained | Expected[1] |
| 13 | 18 | 0.955 | 80 | EPDM[2] | 5 | 26 | 15 | 34 | 14 |
| 14 | 18 | 0.955 | 80 | EPDM[3] | 10 | 27 | 10 | 74 | 16 |
| 15 | 12 | 0.96+ | 80 | " | 10 | 27 | 10 | 26 | 7.6 |
| 16 | 18 | 0.955 | 80 | EPDM[2] | 15 | 26 | 5 | 180 | 19 |
| 17 | 18 | 0.955 | 75 | EPDM[3] | 5 | 27 | 20 | 34 | 34 |
| 18 | 18 | 0.955 | 75 | " | 10 | 27 | 15 | 67 | 36 |
| 19 | 12 | 0.96+ | 75 | " | 10 | 27 | 15 | 127 | 6.7 |
| 20 | 12 | 0.96+ | 70 | EPDM[2] | 5 | 19 | 25 | 96 | 3.5 |
| 21 | 12 | " | 70 | " | 10 | 19 | 20 | 384 | 6.1 |
| 22 | 12 | " | 70 | EPR | 10 | 19 | 20 | 60 | 6.1 |
| 23 | 12 | " | 70 | EPDM[3] | 10 | 27 | 20 | 600 | 6.1 |
| 24 | 12 | " | 70 | EPDM[2] | 10 | 27 | 20 | 1600 | 6.1 |
| 25 | 12 | " | 70 | " | 10 | 29 | 20 | 1200 | 6.1 |
| 26 | 18 | 0.955 | 70 | EPDM[3] | 10 | 27 | 20 | 1130 | 86 |
| 27 | 18 | " | 70 | " | 15 | 27 | 15 | 1630 | 88 |
| 28 | 18 | " | 70 | " | 20 | 27 | 10 | 1370 | 90 |
| 29 | 12 | 0.96+ | 60 | EPDM[2] | 10 | 19 | 30 | > 400 | 5.7 |
| 30 | 12 | " | 60 | " | 15 | 26 | 25 | > 400 | 9.4 |
| 31 | 12 | " | 60 | EPR | 15 | 26 | 25 | > 400 | 9.4 |
| 32 | 12 | " | 60 | EPDM[2] | 20 | 19 | 20 | > 400 | 15 |

[1]A semilog plot of ESCR (log scale) vs. % component 2 or 3 is linear. The expected values were obtained by ratio of the logs of the ESCR values for the individual components at the total % component 2 or 3 used.
[2]Ethylene-propylene-5-ethylidine-2-norbornene terpolymer
[3]Ethylene-propylene-1,4-hexadiene terpolymer All parts and percentages herein are by weight.

ABBREVIATIONS

C — complete break
P — partial break
N.B. — no break
EPDM — ethylene-propylene-diene terpolymer
EPR — ethylene-propylene copolymer rubber
ESCR — environmental stress crack resistance
EVA — ethylene-vinyl acetate copolymer
HDPE — high density polyethylene
MI — melt index
MWD — molecular weight distribution Having described our invention as related to the embodiments set out herein, it is our intention that the invention be not limited by any of the details of description, unless otherwise specified, but rather be construed broadly within its spirit and scope as set out in the appended claims.

We claim:

1. A blend of polymers especially suitable for the rotational molding of shaped structures, comprising: a three component blend of (1) 60–80 wt.% of a member of a first class consisting of high density polyethylene and high density ethylene-alkene copolymers containing 4 or 6 carbon atoms in the alkene group with (2) 5–20 wt.% of a member of a second class consisting of ethylene-propylene essentially random copolymer and an essentially random terpolymer of ethylenepropylene monomer in which the monomer is selected from the group consisting of 1,4-hexadiene, 5-ethylidine-2-norbornene and 5-methylene-2-norbornene, and (3) 5–30 wt.% of a copolymer of ethylene-vinyl acetate for a total of 100%.

2. The blend of claim 1 wherein said component (2) consists essentially of a said ethylene-propylene copolymer containing 40–95 wt.% of ethylene and 5–60 wt.% of propylene for a total of 100%, and said component (3) contains 65–95 wt.% of ethylene and 5–35 wt.% of vinyl acetate for a total of 100%.

3. The blend of claim 1 wherein component (2) consists essentially of a said terpolymer containing 40–95 wt.% of ethylene, 5–60 wt.% of propylene and 1–8 wt.% of said group monomer for a total of 100%, and said ethylene-vinyl acetate copolymer contains 65–95 wt.% of ethylene and 5–35 wt.% of vinyl acetate for a total of 100%.

4. A blend of polymers especially suitable for rotational molding of shaped structures, comprising: a three component blend of 70 wt.% of high density polyethylene as a first component, 10 wt.% of ethylene-propylene essentially random copolymer as a second component and 20 wt.% of ethylene-vinyl acetate as a third component.

5. A blend of polymers especially suitable for rotational molding of shaped structures, comprising: a three component blend of 70 wt.% of high density polyethylene as a first component, 10 wt.% of ethylenepropylene-monomer essentially random terpolymer as a second component and 20 wt.% of ethylene-vinyl acetate as a third component.

6. A rotationally molded shaped structure, comprising: a three component blend of (1) 60–80 wt.% of a member of a first class consisting of high density polyethylene and high density ethylene-alkene copolymers containing 4 or 6 carbon atoms in the alkene group with (2) 5–20 wt.% of a member of a second class consisting of ethylene-propylene essentially random copolymer and an essentially random terpolymer of ethylene-propylene-monomer in which the monomer is selected from the group consisting of 1,4-hexadiene, 5-ethylidine-2-norbornene and 4-methylene-2-norbornene, and (3) 5–30 wt.% of a copolymer of ethylene-vinyl acetate for a total of 100%.

7. The structure of claim 6 wherein said component (1) consists essentially of a said ethylene-propylene copolymer containing 40–95 wt.% of ethylene and 5–60 wt.% of propylene for a total of 100%, and said component (3) contains 65–95 wt.% of ethylene and 5–35 wt.% of vinyl acetate for a total of 100%.

8. The structure of claim 6 wherein said component (2) consists essentially of a said terpolymer containing 40–95 wt.% of ethylene, 5–60 wt.% of propylene and 1–8 wt.% of said group monomer for a total of 100%, and said ethylene-vinyl acetate copolymer contains 65–95 wt.% of ethylene and 5–35 wt.% of vinyl acetate for a total of 100%.

9. A rotationally molded shaped structure, comprising: a three component blend of 70 wt.% of high density polyethylene as a first component, 10 wt.% of ethylene-propylene essentially random copolymer as a second component and 20 wt.% of ethylene-vinyl acetate as a third component.

10. A rotationally molded shaped structure, comprising: a three component blend of 70 wt.% of high density polyethylene as a first component, 10 wt.% of ethylene-propylene-monomer essentially random terpolymer as a second component and 20 wt.% of ethylene-vinyl acetate as a third component.

* * * * *